US007891317B2

(12) United States Patent
Bodenstab et al.

(10) Patent No.: US 7,891,317 B2
(45) Date of Patent: Feb. 22, 2011

(54) ANIMAL FEEDER

(75) Inventors: Sean T. Bodenstab, Gronlid (CA);
Ronald W. Friesen, Coldstream (CA)

(73) Assignee: Henry H. Frey, Middlefield, OH (US)

( * ) Notice: Subject to any disclaimer, the term of this patent is extended or adjusted under 35 U.S.C. 154(b) by 170 days.

(21) Appl. No.: 12/267,631

(22) Filed: Nov. 10, 2008

(65) Prior Publication Data
US 2009/0056634 A1 Mar. 5, 2009

(51) Int. Cl.
*A01K 1/10* (2006.01)

(52) U.S. Cl. .................... 119/53; 119/52.1; 119/51.01; 119/52.3

(58) Field of Classification Search ............ 119/53, 119/51.01, 51.12, 52.1, 52.3, 52.4, 52.5, 119/54, 56.1, 58, 59, 61.1, 62, 63, 61.3, 410, 119/449, 515, 521, 51.02, 51.5, 53.5, 51.11, 119/52.2, 57.1, 57.91, 57.92, 56.2; D30/121, D30/122, 131, 132; 222/457
See application file for complete search history.

(56) References Cited

U.S. PATENT DOCUMENTS

| 1,380,564 | A | * | 6/1921 | Kennedy ............... 119/54 |
| 1,446,740 | A | | 2/1923 | Eummelen |
| 1,595,758 | A | | 8/1926 | Collins |
| 2,532,698 | A | | 12/1950 | Corkins |
| 3,152,575 | A | | 10/1964 | Singley et al. |
| D245,714 | S | | 9/1977 | Becker |
| D252,592 | S | | 8/1979 | Lage |
| 4,315,483 | A | | 2/1982 | Scheidler |
| 4,385,591 | A | | 5/1983 | Petersen |
| 4,735,171 | A | | 4/1988 | Essex |
| 5,133,293 | A | * | 7/1992 | Boozer ............... 119/61.57 |
| 5,699,753 | A | | 12/1997 | Aldridge, III |
| 5,794,561 | A | | 8/1998 | Schulz |
| 5,819,686 | A | * | 10/1998 | Credeur ............... 119/51.5 |
| 6,199,509 | B1 | | 3/2001 | Mostyn et al. |
| 6,481,374 | B1 | | 11/2002 | Lillig |
| 6,510,813 | B1 | | 1/2003 | Boone, Jr. |
| 6,659,040 | B1 | * | 12/2003 | Decker ............... 119/52.1 |
| 6,920,841 | B2 | | 7/2005 | Meritt |
| 7,302,912 | B2 | | 12/2007 | Boyer |

(Continued)

*Primary Examiner*—Andrea M Valenti
(74) *Attorney, Agent, or Firm*—Rankin, Hill & Clark LLP

(57) ABSTRACT

An animal feeder for supplying a feed to an animal of choice for feeding the animal of choice in an unprotected environment such as the outdoors. The feeder comprising a base for support the feeder on a ground surface, a support frame extending upwardly from the base and a hopper supported by the frame. The hopper having a storage reservoir for storing a supply of feed with a feed entry opening that is closeable to prevent exposure to the outdoors. The hopper further including a feed chute below the reservoir having an upper region sealingly joined to the reservoir and a lower region below the upper region that is sealingly joined to a feeding chamber. The feeding chamber having a bottom surface wherein the feed supply can move from the reservoir into the feeding chamber and rest on the bottom surface based on gravity alone. The hopper further including a horizontally extending elongated channel extending from the feeding chamber with an outer end having a feeding opening open to the outdoors wherein the feeding chamber is spaced from the opening and the feed substantially remains within the hopper and spaced from the outdoors until it is consumed by the animal of choice.

20 Claims, 6 Drawing Sheets

U.S. PATENT DOCUMENTS 7,735,454 B1 * 6/2010 Stoppelberg ............... 119/52.4
2003/0005887 A1 1/2003 Graham
2004/0031820 A1 2/2004 Maggi
2005/0229860 A1 * 10/2005 Meritt ........................ 119/53

* cited by examiner

ANIMAL FEEDER

This application claims priority to and the benefit of the filing date of U.S. application Ser. No. 11/489,690, filed Jul. 19, 2006, which application claims priority to and the benefit of the filing date of U.S. provisional application Ser. No. 60/700,818, filed on Jul. 20, 2005, entitled "ANIMAL FEEDER", which applications are incorporated by reference in their entirety.

This invention relates to the art of feeding animals and, more particularly, to an animal feeder that can feed multiple animals simultaneously and can maintain a large supply of feed without the feed being adversely exposed to the environment and other animals.

INCORPORATION BY REFERENCE

The present invention relates to animal feeders and, more particularly, to an animal feeder that is adaptable to feed more than one animal and maintain a large supply of feed. United States published application No. US 2003/0005887 discloses an animal feeder having a container for maintaining the feed and multiple outlets for feeding the animals and is incorporated by reference herein as background information illustrating the same. Schultz U.S. Pat. No. 5,794,561 discloses an animal feeder including a large feed storage bin and a feed trough, and is also incorporated by reference herein as background information illustrating the same. Aldridge, III U.S. Pat. No. 5,699,753 discloses an animal feeder including a large feed storage bin and a feed trough, and is also incorporated by reference herein as background information illustrating the same. Mostun et al U.S. Pat. No. 6,199,509 discloses a gravity deer feeder with baffles, and is incorporated by reference herein as background information illustrating the same. Scheidler U.S. Pat. No. 4,315,483 discloses an animal feeder including a large feed storage bin and a feed dispenser, and is also incorporated by reference herein as background information illustrating the same. Becker Des. 245,714 discloses an animal feeder design, and is also incorporated by reference herein as background information illustrating the same. All of these patents are attached to this application and form a part of the specification of this application.

BACKGROUND OF THE INVENTION

The present invention is particularly applicable for use in connection with feeding deer and, therefore, will be describe with reference to deer. However, the invention of this application has broader application and can be used to feed a wide variety of animals both wild and domestic.

Owners of animals, and those who raise animals, keep these animals in pens, corrals or cages and the like to contain the animals for extended periods of time. These animals need to be routinely fed to maintain the animals and promote the growth of the animals. These animals can be domestic animals or even wild animals and these animals can be used for a wide range of purposes. As can be appreciated, periodically feeding the animals can be time consuming and expensive if human intervention is needed each time the animals need to be fed. In this respect, animals are conventionally fed at selected intervals, such as morning and evening. As a result, the owners often employ someone to feed their animals and the expense of employing someone to feed the animals twice daily can be substantial.

In addition, it is also desirous to leave the animals unattended in the fenced area for extended periods. As a result, the feeding of the animals is sometimes attempted by merely depositing, in an open container, a supply of feed which should adequately feed the animal during the period of absence. Such practice invites other animals to enter the fenced area and consume the feed. Further, the unattended feed is exposed to the elements and can become contaminated.

It is of course well known that a feeding station can be used to feed multiple animals to allow the animals to be unattended for longer periods of time. The feeding station can have a feed bin or hopper to support a supply of animal feed and can also include multiple outlets or troughs so that more than one animal can feed at one time. Further, it is also known that gravity can be used in connection with a feed flow arrangement to move the feed from the feed hopper to the feed trough.

However, prior art animal feeding devices have been found to be inefficient in controlling the flow of feed and inefficient in feeding many types of animals such as deer. The prior art devices also expose at least some of the feed to the environment. This exposed feed is typically the same feed that the animals are directly feeding from. Further, the prior devices do not employ efficient mechanisms to easily control when the animals can feed and mechanisms to allow the feeder to be easily moved.

SUMMARY OF THE INVENTION

In accordance with the present invention, provided is an animal feeder that efficiently feeds animals and that can store quantities of feed over a long period of time and which can control the eating intervals of the animals. More particularly, provided is an animal feeder that includes a supply hopper for the animal feed and at least one feeding outlet that is shaped to receive the snout of the desire animal or animals to be fed.

In this respect, an animal feeder according to the present invention includes a base for supporting the feeder on a ground surface and a support frame extending upwardly from the base. The feeder further includes a hopper supported by the frame wherein the hopper has a storage reservoir for storing a supply of feed with a feed entry opening. In addition, the hopper includes a feed chute below the reservoir having an upper region sealingly joined to the reservoir and a lower region below the upper region that is sealingly joined to a feeding chamber. The feeding chamber has a feed supporting surface wherein the feed supply can move from the reservoir into the feeding chamber and rest on the surface based on gravity alone. The hopper further including a horizontally extending elongated channel extending from the feeding chamber and the channel having an outer end and being enclosed except for a feeding opening at the outer end. In addition, the channel has a length such that the feeding chamber is spaced from the opening and the feed substantially remains within the hopper.

In accordance with another aspect of the present invention, provided is an animal feeder having a hopper with a storage reservoir for storing a supply of feed and protecting the feed from the outdoors. The feeder further includes a plurality of feeding chambers in fluid communication with the storage reservoir each having an inner opening for receiving the feed from the reservoir based on a gravity flow alone and at least one feeding supporting surface positioned near the inner opening for receiving and stopping the gravity flow. Each chamber further including a support surface for supporting the feed within the feeding chamber and an enclosed elongated feeding channel extending outwardly away from the inner opening. This channel forms a portion of the supporting surface and has an outer opening spaced from the at least one supporting surface such that the gravity flow stops before the opening. Further, the channel has a length and a cross-sectional configuration configured to allow the snout of the animal of choice to enter the channel and reach the feed on the supporting surface.

In accordance with another aspect of the present invention, provided is an animal feeder that further includes a trough that can be used as a spill tray to catch feed that inadvertently falls from the feeding outlet(s).

In accordance with yet another aspect of the present invention, provided is an animal feeder that further includes a trough or spill tray that can be used to catch feed that inadvertently falls from the feeding outlet and which is selectively positionable relative to the outlet(s) to prevent an animal from feeding.

BRIEF DESCRIPTION OF THE DRAWINGS

The foregoing and more, will, in part, be obvious and, in part, be pointed out more fully hereinafter, in connection with a written description of preferred embodiments of the present invention illustrated in the accompanying drawings in which.

DESCRIPTION OF PREFERRED EMBODIMENTS

Figure 1:
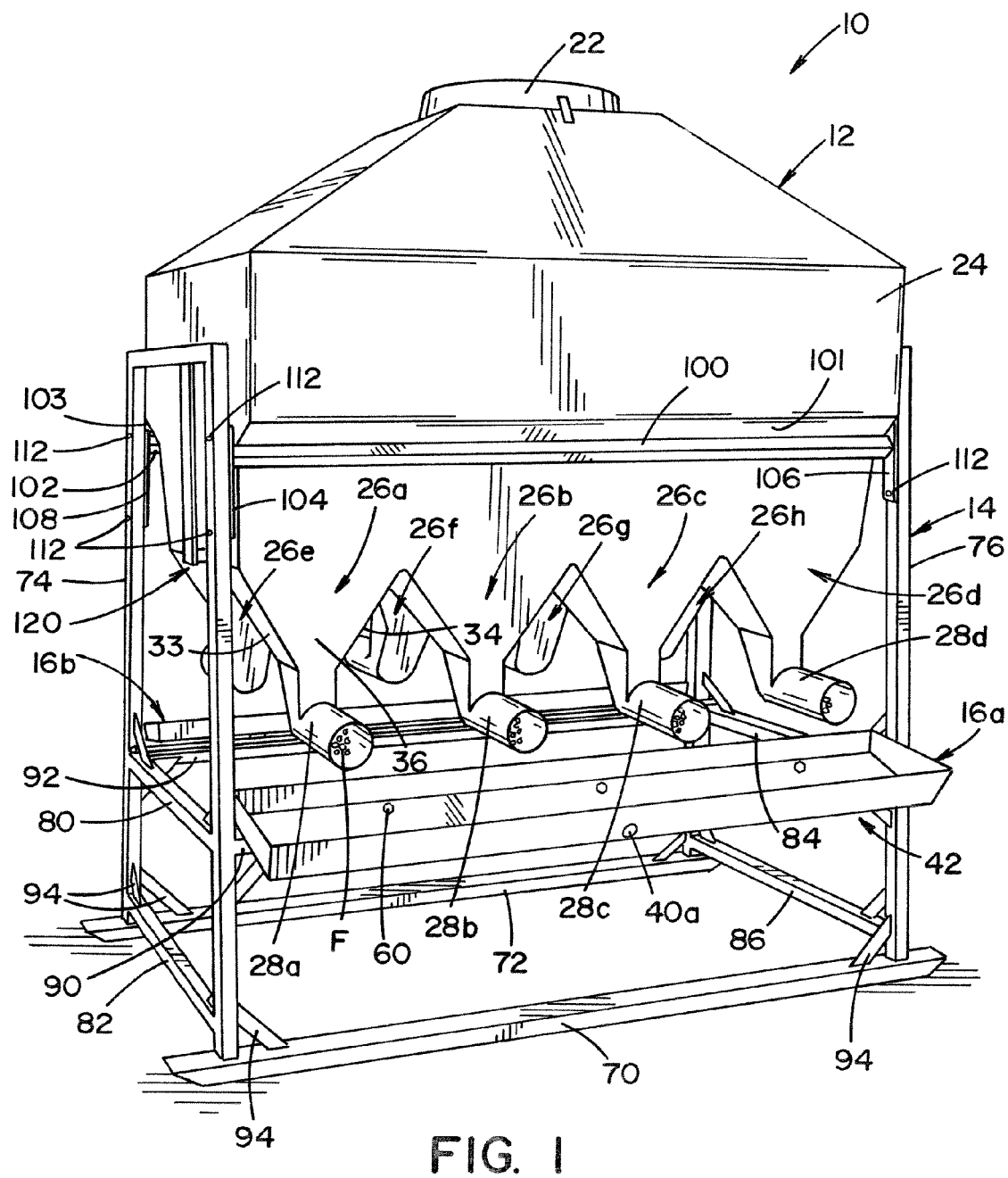
FIG. 1 is a front side perspective view of an animal feeder in accordance with the present invention.
Figure 2:
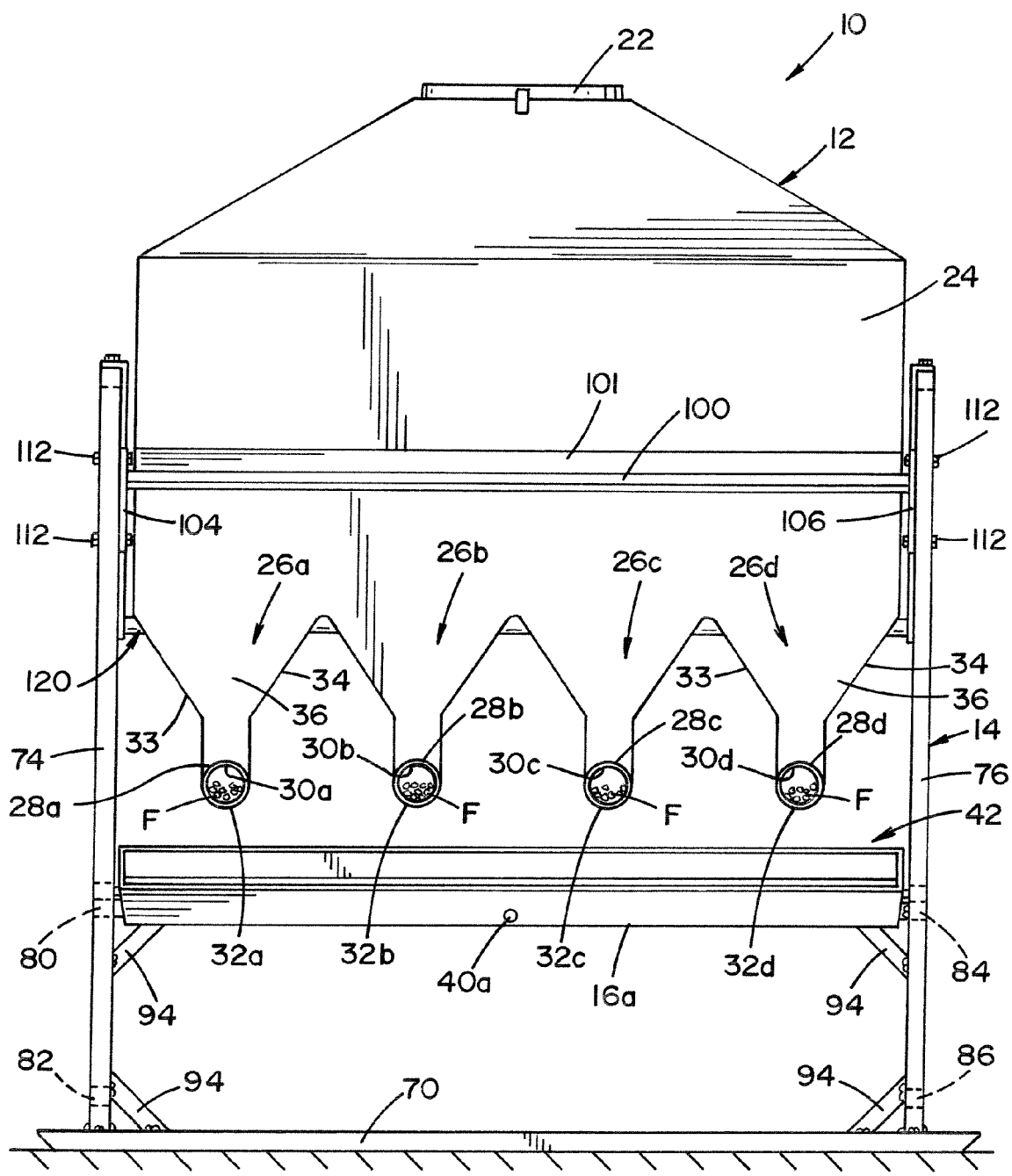
FIG. 2 is a front view of the animal feeder shown in FIG. 1 which is in the feeding position.
Figure 3:
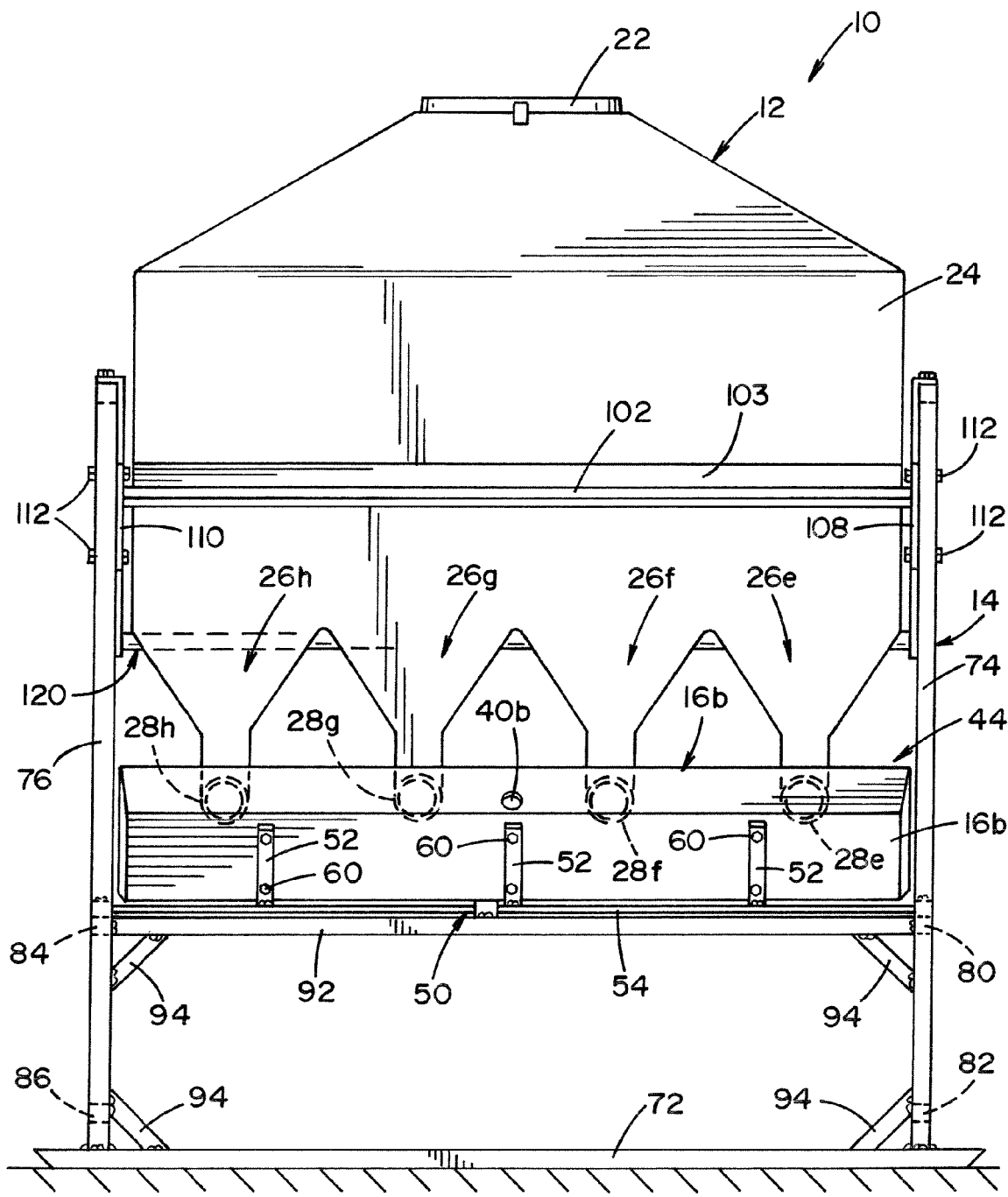
FIG. 3 is a back view of the animal feeder shown in FIG. 1 which is in the closed position.
Figure 4:
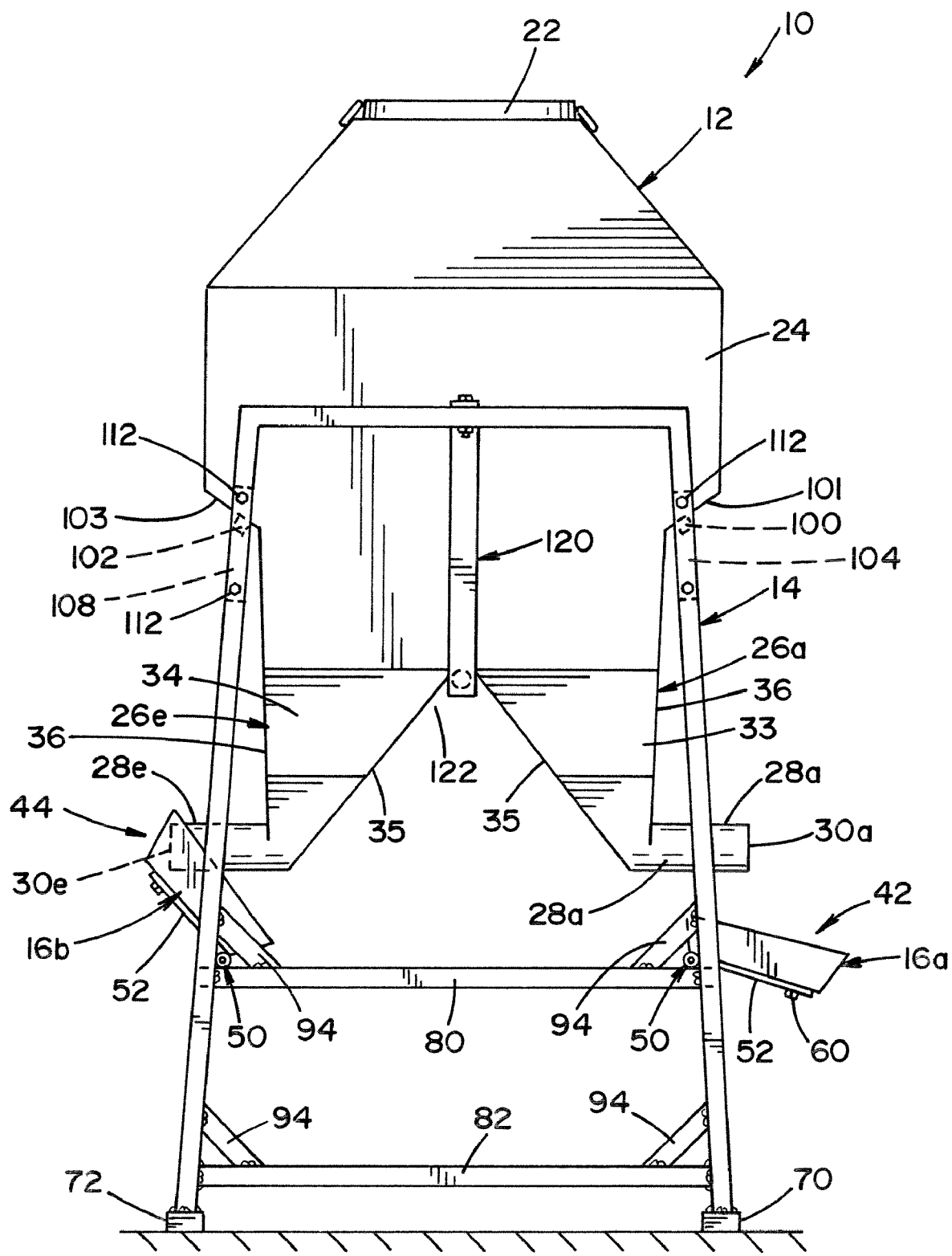
FIG. 4 is an end view of the animal feeder shown in FIG. 1.

Referring now in greater detail to the drawings, wherein the showings are for the purpose of illustrating preferred embodiments of the invention only, and not for the purpose of limiting the invention, the figures show many aspects of an animal feeder according to the present invention.

With reference to FIGS. 1-6, shown is a deer feeder 10 having a hopper 12, a support frame 14 and spill or overflow troughs 16a and 16b. The feeder is utilized to feed any one of a wide range of animals including, but not limited to, domestic animals and wildlife. As is discussed above, keepers of animals must feed these animals, and it is advantageous that they have an efficient and cost effective way of feeding the animals. The invention of this application can be many different sizes without detracting from the invention of this application. This includes increasing and/or reducing the dimensions of any one component of the feeder or all components of the feeder.

Hopper 12 is designed and configured to retain and support a desired quantity of animal feed F, that can be a wide range of animal feed known in the art, and can be made according to any manufacturing techniques known in the art. It has been found that plastics can be used to create a durable hopper that protects the animal feed from the elements and which is lightweight and durable. In particular, it has been found that a rotating mold can be used effectively to mold the plastic hopper as a unified one-piece hopper. The hopper is supported and maintained in a desired position by support frame 14.

Hopper 12 is constructed to include a top opening 20 having a protective lid 22 for sealing the opening is configured to protect the feed after it has been loaded into the hopper. As can be appreciated, feeder 10 can be utilized outdoors such that the feed must be protected by the feeder in that it must remain dry and free of contaminations. Hopper 12 further includes a storage reservoir 24 sized based on the amount of feed that is desired to be maintained at one time in the animal feeder.

Hopper 12 can further include a feed directing chute 26 to direct the gravitational flow of the feed downwardly in the feeder as will be discussed in greater detail below. In one embodiment, feeder 10 include chutes 26a-26h to allow the feed in the hopper to be directed from reservoir 24 to a respective one of feeding chambers 28a-28h. While eight feeding arrangements are shown, the invention of this application can include more or less than eight feeding arrangements without detracting from the invention of this application. Chutes 26a-26h can be used to "funnel" the feed into the respective feeding chambers. Chutes 26a-26h can respectively be formed by walls 33, 34, 35 and 36, as is shown on chute 26a, to direct the flow to the feeding chambers that are configured to be accessed by the desired animal. Some or all of these walls can be tapered inwardly such that the feeding chamber is a desired size. As is shown, walls 33, 34 and 35 are tapered inwardly while wall 36 is basically vertical.

Feeding chambers 28a-28h have feed supporting surface 29a-29h, respectively to support the feed in the feeding chamber and to maintain the feed within the animal feeder while allowing the animal to access the feed in the feeding chamber through openings 30a-30h. Elongated channels 32a-32h can be anyone of a number of configurations including the cylindrical configuration shown. The channels are configured to allow snout S of animal A to enter the feeder and access the feed. Further, in this embodiment, the feeding chamber is partially formed by the channel and, therefore, the supporting surface for the feed is a single surface for each station. However, if other configurations, such as an octagonal cross-sectionally configured channel would result in multiple surfaces being utilized for the supporting surfaces 29a-29h.

By spacing the feeding chamber from opening 30, the feed remains spaced from the outside and is, therefore, at least partially protected form the environment such as from rain and snow. However, since channel 32 is configured to the size and the shape of the snout of the desired animal, the snout of the animal can enter the animal feeder and feed on the feed within the feed chamber at any time. Further, it has been found that other animals, such as raccoons and birds, do not and/or cannot enter the channels to steel food. In this respect, the channels are too small for raccoons to enter and too long to allow them to pull the food out. With respect to birds, they could move into the channel, but the bird would be required to back out of the channel which is a motion that they are not willing to make.

As can be appreciated, feed chambers 28a-28h can be a portion of channels 32a-32h, respectively, can be completely formed by the channel and/or can be separate components with out detracting from the invention of this application. Further, each of the feed chambers and/or channels can be configured differently. For example, it has been found that it can be advantageous to configure one or more of the feeding channels and chambers for younger animals. This allows free access to younger animals even when larger dominant adults are around. Since the channel and chamber are too small for the larger animals, the larger animals will loose interest in that particular station a find a larger channel for feeding.

As is discussed above, channels 32a-32h are designed to prevent food from falling from the hopper and to protect the food from the elements. In this respect, elongated channels 32a-32h can have a length 38 that is long enough to prevent the feed from falling from outlet 30 while being short enough to allow snout S of animal A to enter and reach the respective feeding chamber. Again, length 38 can be adjusted or changed based on the snout size of the animal to be fed. Further, the cross-sectional opening configuration of opening 30 and elongated channel 32 can be configured based on the animal to be fed and, further, to prevent unwanted animal feeding of other species and/or ages. Again, while elongated channel 32 is shown to be a cylindrical channel, other configurations could be utilized without detracting from the invention of this application. In addition, while the elongated channel is shown to have a uniform cross-sectional configuration, a tapered channel could be used, or other configurations could be used without detracting from the invention of this application.

As animal A feeds from feeding chamber 28, feed F continually replenishes the feeding chamber based on a gravitational flow from reservoir 24. This feeding chamber configuration allows the animal to feed upon demand while continuously preventing the feed from being exposed to the elements. As can be appreciated, feed which is deposited in an open tray can be damaged by rain, snow or other environmental factors. By maintaining the feed in a protective position in the feeder, these factors are minimized. Further, the feed is also shielded from sunlight in addition to the other environmental factors discussed above.

In one embodiment, feeder 10 can include trough or spill trays 16a and 16b. These trays are not designed to be used primarily as a feeding tray. Conversely, troughs 16 are configured primarily to catch the overflow and spillage from the animal when it feeds from the feed chamber. In this respect, the feeding action of animals can cause some of the feed to exit opening 30. Accordingly, trough 16 can be used to catch the falling feed and prevent it from accumulating on the ground. This configuration prevents the animals from feeding on the ground wherein the feed has been exposed to the environment. Further, it allows for the easy clean-up of spilled feed to reduce the attraction of unwanted animals such as raccoons. As can be appreciated, the animals may eat the spilled food, however, this spilled food is not on the ground. Spill troughs 16a and 16b can include an opening 40a and 40b, respectively, which can be used to clear the overflow feed periodically. As can be appreciated, the overflow feed is exposed to the elements; and this opening can be used to easily remove the feed from the tray into a container to safely carry the discarded feed away from animal feeder 10. In addition, opening 40 can also be used as a drain point for moisture in the tray such as from rain or snow. Opening 40 can be positioned anywhere in tray 16. Tray 16 can be made from any material known in the art and is preferably made from a weather resistant material. As is shown, trays 16a and 16b are made from a plastic material to minimize the effect of the environment on this component. As can be appreciated, rust and other environmental damages to this component part could have an adverse effect especially since it is positioned near the feeding point(s) of the animal feeder. As is stated above, the animals may feed from the feed which has fallen from the outlets.

Figure 5:
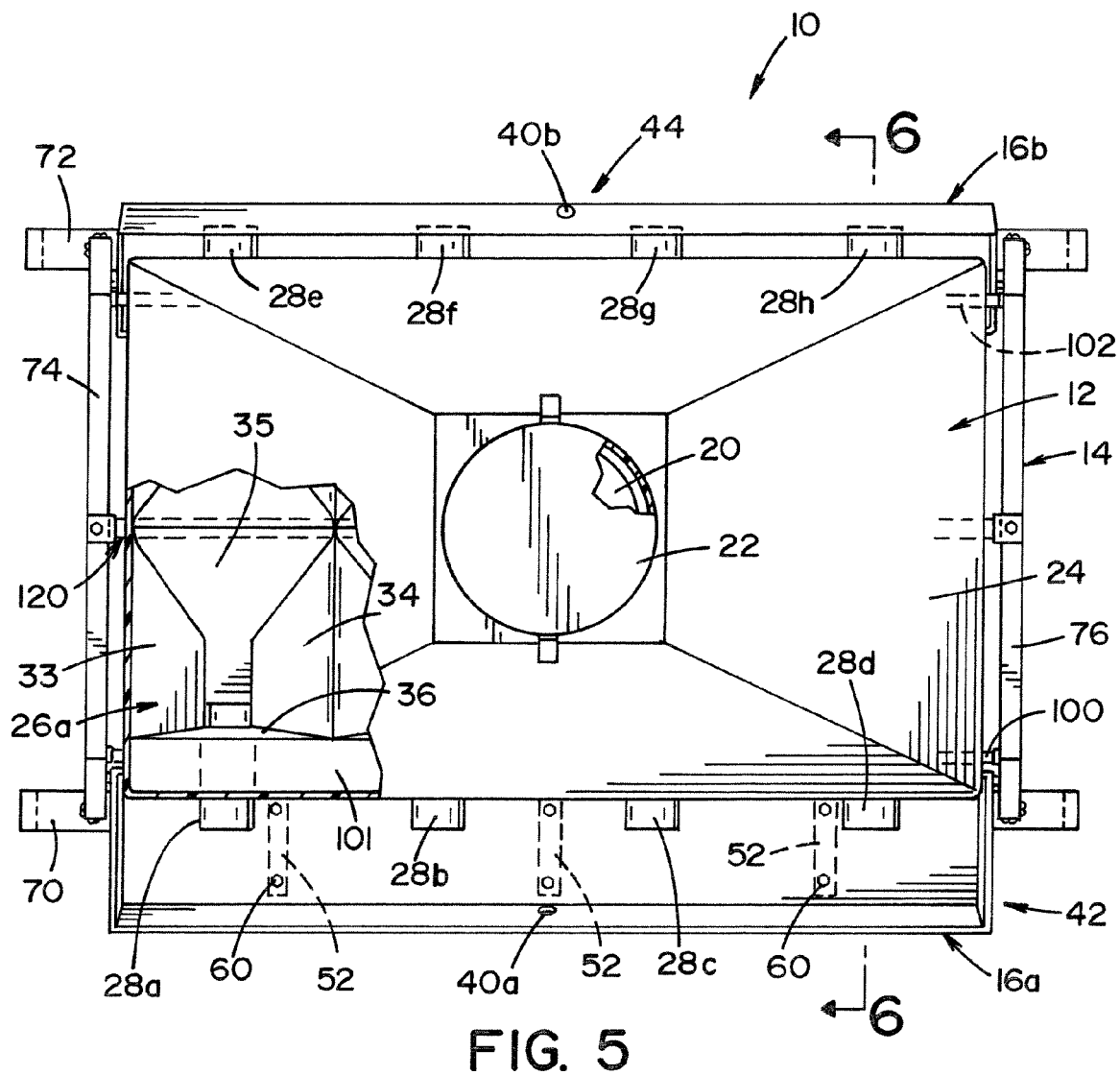
FIG. 5 is a top view, partially in section, of the animal feeder shown in FIG. 1 wherein one side is in the feeding position and one side is in the closed position; and, FIG. 6 is an enlarged sectional view taken along lines 6-6 in FIG. 5.
Figure 6:
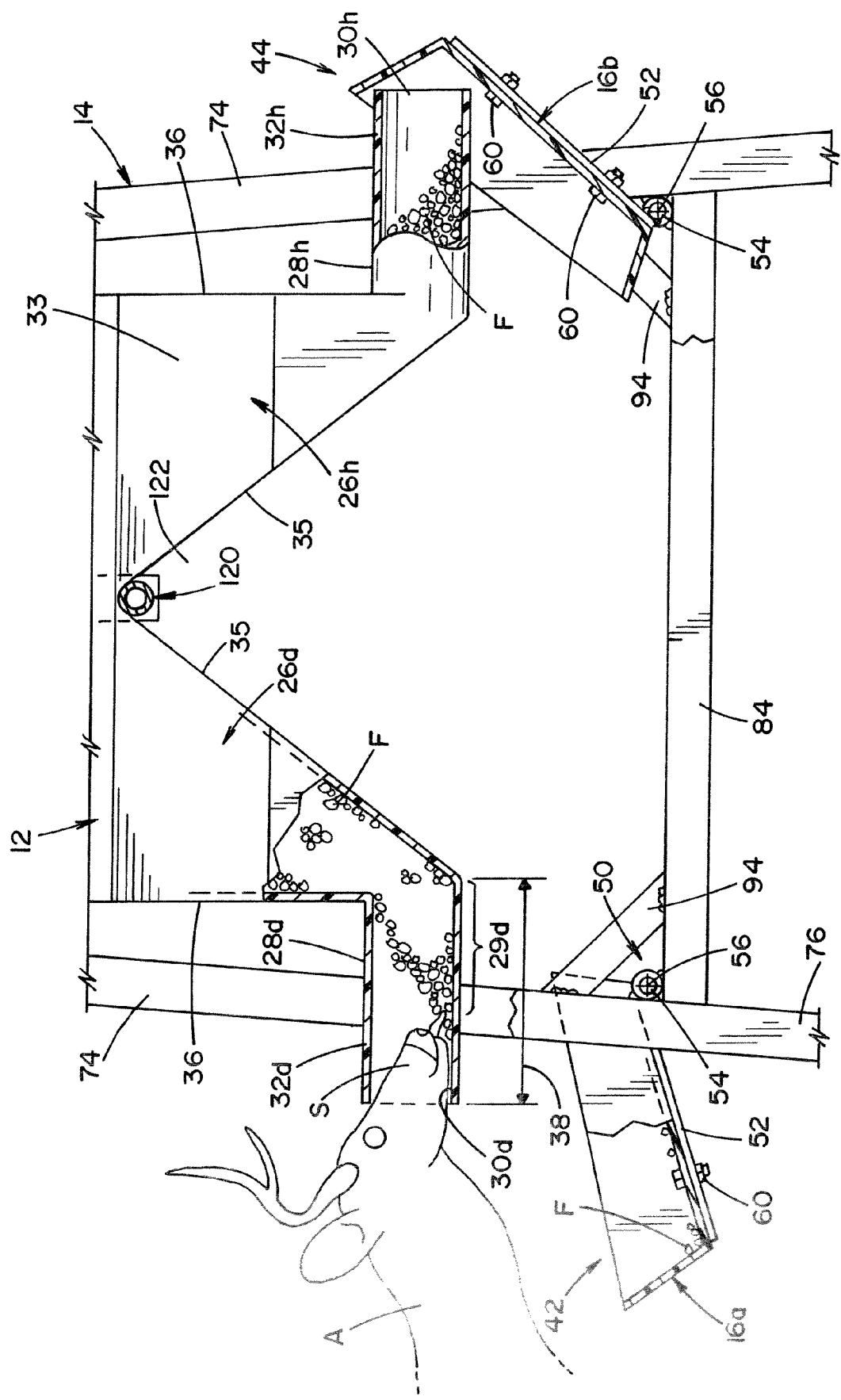

With reference to FIGS. 5 and 6, in yet another embodiment, trough 16a and/or 16b can be pivotally connected to frame 14 to allow the trays to pivot from an opened or feeding position 42 to allow the animal to feed from the animal feeder to a closed position 44 which prevents animal feeding. As is shown, trough 16b is in closed position 44 and trough 16a is in opened position 42. As is stated above, it is desirous to have control over the time and frequency that a particular animal feeds. By including a pivotal tray configuration, the feeding of the animals can be easily controlled. Further, this tray configuration prevents the feed from being exposed to the elements by at least partially closing opening 30. While, as shown, the animal feed is not sealed, moisture is prevented from entering opening 30 when tray 16 is in closed position 44. This configuration can also allow moisture in the feeding chamber to evaporate, which would not be possible if openings 30 were completely sealed. The pivotal action of each tray 16 is achieved by hinges 50 each having several hinge plates 52 connected to hinge rods 54. Hinge rod 54 is allowed to pivot relative to the frame about an axis 56, such that tray 16 pivots about axis 56 between the feeding position and the closed position. While one particular hinge assembly is shown, other assemblies known in the art could be used for either tray without detracting from the invention of this application. Hinge plate 52 is secured the trays by fasteners 60, which can be any known fasteners in the art.

Tray 16 and hinge 50 can further include a lock assembly, not shown, which can be any known lock assembly and can be fashioned to prevent the animal from overriding the lock assembly and moving the tray from the closed position to the open position. Further, tray 16 does not need to cover all outlets on one side, wherein multiple trays could be used on either side to selectively close one or more of the feeding openings without closing all openings. Further, the trough on the back side can be the same or different than the trough on the front side of feeder 10. As will be discussed in greater detail below, the openings and feeding chambers can also be configured differently from one station to the next to allow the animal feeder to be used with multiple species of animals and also animals of different sizes or ages. Further, reservoir can also be sectioned to allow different feed to exit out of different feeding stations.

As is stated above, feeder 10 is supported by a frame 14. This frame can be designed from any known framing techniques in the art. As is shown, frame 14 includes base members 70 and 72 to support the animal feeder on a desired ground surface. These base members can be skid-like members to allow the animal feeder to be pushed or pulled over a wide variety of terrain. As is shown, frame 14 is a steel frame, wherein the steel is coated with a weather-resistant coating, such as a paint. The components of the frame are welded and/or bolted together based on the desired characteristics of the particular joint. As will be discussed below, some components of the frame are designed to be removable such that components, such as the hopper, can be removed without damaging the frame. Frame 14 further includes inverted U-shaped end assemblies 74 and 76 that are secured to base members 70 and 72. End assembly 74 includes cross members 80 and 82, and end assembly 76 includes cross members 84 and 86. End assemblies 74 and 76 are joined by base members 70 and 72 and also by intermediate members 90 and 92. Again, as is stated above, the joints between these members can be joined by any known means in the art; and as is shown, these components are welded together to create a secure and rigid base for the frame of the animal feeder. Tray 16 can be pivotally joined to one or more of these frame components to allow the pivotal rotation about axis 56. Further, these joints can include joint-reinforcing cross member 94, which can be sized and configured based on the desired strength characteristic of the particular joint.

Frame 14 can further include removable frame sections 100 and 102 that, in part, support the weight of hopper 12 and position the hopper over the trays. Frame sections 100 and 102 can be removable to allow hopper 12 to be removed from frame 14 without damaging the hopper or the frame. Frame sections are positionable in recesses 101 and 103, respectively which in part support the hopper. As is shown, frame section 100 includes end plates 104 and 106; and frame section 102 includes end plates 108 and 110. End plates can be selectively joined to inverted U-shaped end assemblies 74 and 76 by fasteners 112. While fasteners 112 are shown to be threaded fasteners, they can be any fasteners known in the art without detracting from the invention of this application. By utilizing threaded fasteners, or other quick-release fasteners, hopper 12 can be easily removed from the frame assembly.

While base members 70 and 72 are shown to include skid configurations to move the animal feeder across a ground surface, other types of movement configurations could be used with the invention of this application. This can include, but is not limited to, wheels utilized on one or more ends of the frame assembly and even a solid base assembly, such as a sled-like configuration. With respect to a base which includes wheels, the axles of the wheels could be movable relative to the bottom of the frame, such that the surface of the wheels is spaced from the ground surface when in a stationary position, and the wheels could be moved downwardly to engage the ground surface when the animal feeder is to be moved.

Frame 14 can further include a central support member 120 to further support the hopper 12. As is shown, hopper 12 includes directing chutes 26a-26h which direct the feed outwardly toward the feeding stations. This creates a central V-shaped area 122 in the hopper portion of the animal feeder. This central support member can be used to further support the hopper by supporting the underside of this V-shaped arrangement. This assembly can also be selectively detachable to help remove the hopper from the frame.

As can be appreciated, the animal feeder of the invention of this application can have many configurations. This includes changes to the number of outlets or feeding stations, including but not limited to, one station, or more than eight feeding station. This further includes a feeding stations on only one side or outlets on more than two sides. Further, the feeder could include multiple outlets 30 and feeding chamber 28 wherein some or all feeding stations are configured differently. For example, as discussed above, one or more the stations could be configured for a younger animal which includes lowering the particular feeding station. This can further include, an animal feeder that includes one or more smaller outlets which are lower to the ground while having other, larger outlets higher from the ground. Again, this particular arrangement allows certain outlets to be used by smaller or younger animals, while the larger outlets can be used by the adult animals. By having this multiple outlet size arrangement, adult animals cannot feed from the smaller outlets and will not feed from these outlets, thereby allowing the smaller, less dominant animals to feed. Multiple outlet configurations could also be used for the use of the animal feeder with more than one species. For example, one side of the animal feeder could be used for one species, while the other side of the animal feeder could be used for another species. The animal feeder could then be positioned such that it is between two different animal pens, such that the outlets from one side extend into one pen, while the outlets from the other side extend into another pen. Furthermore, hopper 12 could be a single-chamber hopper, or it could be a multiple-chamber hopper, wherein different types of feed could be simultaneously contained within one animal feeder.

While considerable emphasis has been placed on the preferred embodiments of the invention illustrated and described herein, it will be appreciated that other embodiments can be made and that many changes can be made in the preferred embodiments without departing from the principles of the invention. Accordingly, it is to be distinctly understood that the foregoing descriptive matter is to be interpreted merely as illustrative of the invention and not as a limitation.

Having thus described the invention, it is so claimed:

1. An animal feeder for supplying a feed to an animal of choice for feeding the animal of choice in an unprotected environment such as the said feeder comprising a support frame including a base for supporting said feeder on a ground surface, said support frame extending upwardly from said base and supporting a hopper above the ground surface, said hopper having a storage reservoir for storing an associated supply of feed with a feed entry opening that is closeable to prevent exposure to the outdoors, said hopper further including a feed chute below said reservoir having an upper region sealingly joined to said reservoir and a lower region below said upper region that is sealingly joined to a generally horizontal and generally uniform feeding tube extending between a tube inner end and a tube outer end, said tube including a feeding chamber between said inner and outer ends, said outer end that is open to the outdoors forming a feeding opening such that said feeding opening is defined by an unobstructed inner perimeter edge in said outer opening which is sized to allow an associated animal's snout to enter the feeding tube and access the associated feed in the feeding chamber such that said unobstructed inner perimeter edge forming said feeding opening is formed by the complete circumference of said uniform tube, said feeding chamber being spaced from said outer end and a gravity flow of the associated feed moving said feed by gravity alone into said feeding chamber but said gravity flow ending before said outer end such that when said feed chute is substantially full of the associated feed the associated feed and said feeding chamber is spaced from said unobstructed inner perimeter edge of said feeding opening a distance generally equal to about half or more of the length of the snout of the animal of choice, said feeder further including a spill tray spaced from said gravity flow, said spill tray having an inner and an outer edge with upwardly extending edge walls including an outer upwardly extending edge wall extending from said outer edge, said spill tray being attached directly to said frame and extending outwardly from said frame such that said spill tray including said edge walls are all substantially spaced from said feeding opening allowing unrestricted access to said feeding opening by the associated animal such that the associated animal can feed from the feeding tube without interference from said spill tray.

2. The animal feeder of claim 1, wherein said spill tray extends outwardly from said frame at a downward angle and spill tray including said edge walls are all substantially spaced from said horizontal feeding tube and said hopper and below the feeding tube.

3. The animal feeder of claim 1, wherein said feeding tube has a length such that said gravity flow of the associated feed when said feed chute is substantially full of the associated feed stops generally midway between said inner and outer ends such that said feeding chamber is approximately midway between said inner and outer ends when said feed chute is substantially full.

4. The animal feeder of claim 1, wherein said feeding tube is cylindrical having a cross-sectional configuration substantially the same as said opening such that said unobstructed inner perimeter edge of said feeding opening has the same cross-sectional configuration and is unrestricted.

5. The animal feeder of claim 1, wherein said feeding tube extends along a tube axis and said inner perimeter edge forming said feeding opening is at a 90 degree angle from said tube axis.

6. The animal feeder of claim 1, wherein said feeding tube is a uniform tube between said feeding chamber and said feeding opening and including said feeding opening such that said unobstructed inner perimeter edge forming said feeding opening is formed by the complete circumference of said uniform tube and said feeding opening is unrestricted.

7. The animal feeder of claim 1, wherein said feeder includes a plurality of horizontally spaced feeding tubes extending generally parallel to one another, each of said plurality of feeding tubes having a feeding opening at a respective outer end and said feeding openings being generally in a common plane.

8. The animal feeder of claim 7, wherein said spill tray is a single spill tray positioned below all of said feeding openings.

9. The animal feeder of claim 1, wherein said feeder has a front side and a back side, said feeder includes a first plurality of horizontally spaced feeding tubes extending generally parallel to one another from said front side, each of said first plurality of feeding tubes having a feeding opening at a respective outer end and said feeding openings being generally in a first common plane and a second plurality of horizontally spaced feeding tubes extending generally parallel to one another from said back side, each of said second plurality of feeding tubes having a feeding opening at a respective outer end and said feeding openings being generally in a second common plane, said spill tray being a first spill tray positioned below all of said first plurality of feeding openings and said feeder further including a second tray positioned below all of said second plurality of feeding openings.

10. The animal feeder of claim 1, wherein said hopper is a unified molded component.

11. The animal feeder of claim 1, further including a spill tray hinge attached directly to said frame such that said spill tray is pivotally connected directly to said frame below said feeding opening, said spill tray pivoting between a feeding position and a closed position, said spill tray extending outward from said frame when in said feeding position and being substantially spaced from said feeding opening allowing unrestricted access to said feeding opening by the associated animal such that the associated animal can feed from the feeding tube without interference from said spill tray, said spill tray substantially covering said feeding opening when in said closed position, said outer upwardly extending edge wall being spaced below said feeding opening when in said feeding position.

12. The animal feeder of claim 11, wherein said spill tray is formed by a unified molded component and said spill tray hinge includes a plurality of hinges directly connected to said frame.

13. The animal feeder of claim 11, wherein said spill tray includes a base sheet portion extending between said inner and outer edges, said upwardly extending edge walls further including an inner upwardly extending edge wall, said spill tray extending at a downward angle toward said outer edge wall and having a drainage opening in said base sheet portion near said outer edge wall such that any moisture in said spill tray is directed toward said drainage opening, said inner and outer edge walls being below said feeding opening when in the feeding position.

14. An animal feeder for feeding deer comprising a hopper for storing a supply of an associated feed and protecting the feed from the elements; a frame to support said hopper and said feeder on a ground surface; a plurality of feed chutes fluidly connecting said hopper with a plurality of feeding tubes, said feed chutes directing a gravity flow of the associated feed from said hopper to said plurality of feeding tubes and each said tube extending horizontally from one of said chutes and extending parallel to one another, each said feeding tube extending from an inner end joined to a corresponding said one chute and an outer end having an unobstructed feeding opening formed by the walls of said feeding tube such that said feeding opening is formed by the complete circumference of said walls of said feeding tube, said opening being shaped to receive a portion of the snout of an associated deer, said each feeding tube having a length between said inner and outer end such that said gravity flow ends before reaching said feeding opening by a distance approximately equal to about half or more of the length of the associated snout when said feed chute is substantially full of the associated feed thereby producing a feeding chamber spaced from said feeding opening when said feed chute is substantially full of the associated feed; said feeder further including a spill tray spaced from said gravity flow and having an inner and an outer edge with upwardly extending edge walls including an outer upwardly extending edge wall extending from said outer edge, said spill tray being attached directly to said frame and extending outwardly from said frame such that said spill tray including said edge walls are all substantially spaced from said feeding opening allowing unrestricted access to said feeding opening by the associated animal such that the associated animal can feed from the feeding tube without interference from said spill tray.

15. The animal feeder of claim 14, wherein said feeding tubes are cylindrical and extend along a feeding tube axis, said feeding opening being generally at a 90 degree angle to said feeding tube axis.

16. The animal feeder of claim 14, wherein the inner configuration of said each feeding tube is substantially uniform between said inner and outer ends and said feeding opening has substantially the same cross-sectional configuration as said tube.

17. The animal feeder of claim 14, further including a spill tray hinge attached directly to said frame such that said spill tray is pivotally connected directly to said frame about a horizontal axis, below said feeding opening, said spill tray pivoting between a feeding position and a closed position, said spill tray extending outward from said frame when in said feeding position being substantially spaced from said feeding opening allowing unrestricted access to said feeding opening by the associated animal such that the associated animal can feed from the feeding tube without interference from said spill tray, and said spill tray substantially covering said feeding openings when in said closed position.

18. The animal feeder of claim 17, wherein said tray extends downwardly toward said outer edge, said spill tray further including at least one hole near said outer edge to allow moisture to drain from said tray when in said opened position.

19. An animal feeder for supplying a feed to an animal of choice for feeding the animal of choice in an unprotected outdoor environment, said feeder comprising a base for supporting said feeder on a ground surface, a support frame extending upwardly from said base configured to support a hopper over the ground surface, said hopper having a storage reservoir for storing an associated supply of feed with a top side and a bottom side, said feeder further including a feed chute below said reservoir having an upper region fluidly joined to said bottom side of said reservoir and a lower region fluidly joined to a generally horizontal feeding tube extending between a tube inner end and a tube outer end, said tube having an unobstructed feeding opening formed by the complete circumference of said tube at said outer end that is open to the outdoors and a feeding chamber spaced from said opening, said hopper and chute being shaped to produce a gravity flow of the associated feed into said feeding chamber of said feeding tube, said feeding tube having a length between said inner and outer ends such that said gravity flow ends before said outer end when said feed chute is substantially full such that said feeding chamber is spaced from said feeding opening a distance generally equal to about half or more of the length of a snout of the animal of choice, said feeder further including a spill tray spaced from said gravity flow and having an inner edge generally facing said hopper and an outer edge generally facing away from said feeder, said spill tray further including a base plate for capturing feed falling from said feeding opening and an upwardly extending outer tray wall at said outer edge, said feeder further including a hinge receiver directly connected to said frame to receive a hinge directly joined to said spill tray such that said spill tray is pivotally attached directly to said frame below said feeding opening, said spill tray pivoting about an axis defined by said hinge and near said inner edge, said spill tray pivoting between a feeding position and a closed position by way of said hinge, when in said feeding position a portion of said spill tray being directly below said feeding opening and said outer edge being spaced outwardly of said feeding opening wherein said spill tray is substantially spaced from said feeding opening allowing unrestricted access to said feeding tube and said feeding opening by the associated animal of choice, said spill tray substantially covering said feeding opening when in said closed position prevent access to said feeding opening by the associated animal.

20. An animal feeder for supplying a feed to an animal of choice for feeding the animal of choice in an unprotected outdoor environment, said feeder comprising a support frame including a base for supporting said feeder on a ground surface and said support frame extending upwardly from said base to an upper frame structure configured to support a bulk feeding hopper spaced above the ground surface, said hopper having a storage reservoir for storing an associated supply of feed with an upper feed opening, said feeder including a selectively closeable protective lid for said upper feed opening to reduce exposure to the outdoor environment when in a closed condition, said hopper further including a feed chute below said reservoir having an upper region sealingly joined to said reservoir and a lower region below said upper region that is sealingly joined to a generally horizontal feeding tube, said feed chute configured to produce a gravity flow of the associated feed between said reservoir and said feeding tube wherein the associated feed flows from said reservoir to said feeding tube by gravity alone, said gravity flow having a maximum flow when said reservoir is substantially full of the associated feed and said chute is substantially full of the associated feed, said feeding tube being generally uniform and having a tube inner end joined to said lower region of said feeding chute such that said gravity flow enters by gravity alone into said feeding tube and a tube outer end forming a tube feeding opening wherein said tube feeding opening is open to the outdoors, said feeding tube being formed by an unobstructed perimeter tube wall sized to allow the snout of an associated animal of choice to enter into said feeding tube, said unobstructed perimeter tube wall formed by the complete circumference of said generally uniform tube and said perimeter tube wall having an inwardly facing tube surface and said inwardly facing surface controlling the gravity flow of the associated feed in said tube, said unobstructed perimeter tube wall forming said tube feeding opening, said feeding tube having a length between said inner end and said feeding opening such that said maximum gravity flow ends before said tube feeding opening by the resistance produced by said inwardly facing tube surface alone thereby producing a feeding chamber spaced from said feeding opening a distance generally equal to about half or more of the length of the snout of the animal of choice such that a significant portion of the associate snout must enter said feeding tube before the associated animal can feed at said feeder, said feeder further including a spill tray directly connected to said support frame.

* * * * *

UNITED STATES PATENT AND TRADEMARK OFFICE
CERTIFICATE OF CORRECTION

Page 1 of 1

PATENT NO. : 7,891,317 B2
APPLICATION NO. : 12/267631
DATED : February 22, 2011
INVENTOR(S) : Bodenstab et al.

It is certified that error appears in the above-identified patent and that said Letters Patent is hereby corrected as shown below:

In Column 8, Line 3 (Claim 1, Line 2), after "unprotected", insert --outdoor--.

In Column 8, Line 4 (Claim 1, Line 3), after "environment", insert --,--.

In Column 8, Line 4 (Claim 1, Line 3), delete "such as the".

Signed and Sealed this
Twenty-fourth Day of May, 2011

David J. Kappos
*Director of the United States Patent and Trademark Office*